United States Patent
Ou-Yang et al.

(10) Patent No.: US 6,768,553 B2
(45) Date of Patent: Jul. 27, 2004

(54) CONTINUOUS-ZOOM IMAGING DEVICE OF INTERFEROMETER

(75) Inventors: Mang Ou-Yang, Hsinchu (TW); Shin-Gwo Shiue, Hsinchu Hsien (TW); Shin-Maio Tseng, Hsinchu Hsien (TW); Kevin S.H. Kuo, Jubei (TW); Hsin-Chu Liu, Hsinchu (TW); I-Pen Chien, Tao-Yuan Hsien (TW); Jim Chung, Pingjen (TW)

(73) Assignee: K Laser Technology, Inc., Hsinchu (TW)

( * ) Notice: Subject to any disclaimer, the term of this patent is extended or adjusted under 35 U.S.C. 154(b) by 8 days.

(21) Appl. No.: 10/200,204

(22) Filed: Jul. 23, 2002

(65) Prior Publication Data

US 2003/0193670 A1 Oct. 16, 2003

(30) Foreign Application Priority Data

Apr. 11, 2002 (TW) .................................... 91204718 U

(51) Int. Cl.$^7$ .......................... G01B 9/02; G01B 11/26; G01B 11/00; G01J 1/00
(52) U.S. Cl. ..................... 356/495; 356/121; 356/153; 356/154; 356/360; 356/491
(58) Field of Search .......................... 356/495, 121, 356/153, 154, 360, 363, 450, 491

(56) References Cited

U.S. PATENT DOCUMENTS

| | | | | |
|---|---|---|---|---|
| 4,201,473 A | * | 5/1980 | Domenicali et al. | |
| 4,577,131 A | * | 3/1986 | Soobitsky | |
| 5,064,286 A | * | 11/1991 | Ai et al. | |
| 5,097,291 A | * | 3/1992 | Suzuki | |
| 5,473,434 A | * | 12/1995 | de Groot | |
| 5,488,477 A | * | 1/1996 | de Groot | |
| 5,563,706 A | * | 10/1996 | Shibuya et al. | |
| 5,760,902 A | * | 6/1998 | Brody | |
| 5,834,933 A | * | 11/1998 | Meier | |
| 5,917,599 A | * | 6/1999 | Nishikawa et al. | |
| 5,995,222 A | * | 11/1999 | Kanaya et al. | |

* cited by examiner

Primary Examiner—Frank G. Font
Assistant Examiner—Khaled Brown
(74) Attorney, Agent, or Firm—Rosenberg, Klein & Lee

(57) ABSTRACT

The present invention provides a continuous-zoom imaging device of an interferometer. Reflected lights of a reference plane and a test plane interfere with each other to generate an interference pattern. A collimation device converts a parallel light of the interference pattern into a convergent light. An optical path adjustment means guides the light to a polarizing beam splitter. A continuous-zoom device adjusts the magnification ratio of the interference pattern on the imaging passageway and to output an object image, which is then imaged on a charge-coupled device. The present invention can improve the quality of the interference pattern without using any rotating diffuser, and thus has the characteristics of reduced number of components, lowered cost, and shrunk volume. Besides, the present invention can utilize a joint device to connect the continuous-zoom device and an attenuator so as to achieve automatic light adjustment and convenient operation.

9 Claims, 5 Drawing Sheets

CONTINUOUS-ZOOM IMAGING DEVICE OF INTERFEROMETER

FIELD OF THE INVENTION

The present invention relates to a continuous-zoom imaging device of an interferometer and; more particularly, to a continuous-zoom imaging device, which can be widely applied to interference apparatuses, related measurement apparatuses utilizing the interference principle, related imaging devices of interference pattern, and common imaging devices.

BACKGROUND OF THE INVENTION

An interferometer is an apparatus utilizing the interference phenomenon of light for measuring optical devices or other physical parameters. How to effectively obtain the interference pattern is thus an important issue of this kind of apparatus.

There are several kinds of interference systems, but their principle is very similar. With the commonly adopted Fizau type interferometer as an example, as shown in FIG. 1, an interferometer can be divided into two parts, one being a light projection system, the other being an interference pattern imaging system. Please refer to U.S. Pat. No. 4,201,473. The light projection system comprises a laser 10, a spatial filter 12, a splitter 14, a collimation device 16, a reference plane 18, and a test plane 20. In the interference pattern imaging system, reflected lights of the test plane 20 and the reference plane 18 interfere with each other to generate an interference pattern. The interference pattern passes through the collimation device 16, is vertically reflected by the splitter 14, then passes through a rotating diffuser 22, a zoom lens 24, and an attenuator 26, and is finally transmitted to a TV camera 28 to be read out. Therefore, the quality of the interference pattern depends on the imaging system.

In the imaging system of interferometer in prior art, the interference pattern is imaged on the rotating diffuser 22. The image on the rotating diffuser 22 is used as an object image of the zoom lens 24 and imaged on the focus plane of the camera 28. The function of the rotating diffuser 22 is to resolve the noise problem generated in optical paths of interferometer. Please refer to U.S. Pat. No. 4,201,473. The reason is that the interference pattern is not generated only on the reference plane 18 and the test plane 20. Dusts on an optical device like the splitter 14, the collimation device 16, or the spatial filter 12 will cause some trace reflection lights, which will generate some trace minor fringes, These noises are, and can be eliminated using the diffuser.

Moreover, the output power and coherent stability of the laser will generate time speckles, which will affect the stability of interference pattern. The diffuser can be used to average these noises. However, the diffuser itself is not perfectly flat so the laser light will generate space speckles on the plane to affect the quality of interference pattern. The diffuser must be rotated to resolve this problem by averaging in time and space. This way is the most commonly used method. But the rotating diffuser causes many problems described in detail below. The rotating diffuser will let the interference pattern not be directly imaged on a CCD, hence increasing noise of image and also reducing the transmittance of the diffuser and the modulation transform function (MTF). Because the image on the rotating diffuser is like a Lambertian surface, the phenomenon of vignetting will easily occur when the zoom lens forming the image on the CCD. This will bring about a very large difference between the brightness at the edge and the center of the interference image, resulting in difficulty in discrimination of image, as shown in FIG. 2. In order to improve this drawback, it is necessary to design a very high-end zoom lens, hence increasing the cost and being impractical. Furthermore, it is necessary to add a motor in the apparatus for driving the rotating diffuser to rotate. The coaxial stability of the motor is thus very important. Vibration caused by the motor will also affect the interference pattern.

It is necessary to add many components using the above conventional method, hence increasing the volume, weight, and cost and also difficulty in assembly. Please refer to U.S. Pat. Nos. 4,577,131 and 5,473,434. In order to keep a stable brightness of the interference pattern during the zooming process, it is necessary to add an attenuator for fine tuning. Most designs mainly adopt two-stage adjustment (the zoom lens 24 and the attenuator 26 are adjusted, respectively) without any joint device, hence resulting in complexity and variation in measurement. Accordingly, the present invention aims to propose a continuous-zoom imaging device of interferometer to resolve the above problems in the prior art.

SUMMARY AND OBJECTS OF THE PRESENT INVENTION

The primary object of the present invention is to propose a continuous-zoom imaging device of an interferometer, which shortens the optical path of interference pattern and reduces disturbance of noise in the optical path, thereby improving the quality of interference pattern and thus obtaining a high-quality image of interference pattern.

Another object of the present invention is to provide a continuous-zoom imaging device of an interferometer without a rotating diffuser. The design without any motor overcomes the problems of coaxial stability and vibration and also has the advantages of shrunk volume, reduced number of components, lowered cost, and easy assembly.

Yet another object of the present invention is to provide a continuous-zoom imaging device of an interferometer, whose magnification ratio can be adjusted, and a joint attenuator can be matched to achieve the object of automatic adjustment of light.

Still yet another object of the present invention is to provide a continuous-zoom imaging device of an interferometer, which can extend the application range of apparatus, increase convenience in operation, and simultaneously reduce complexity in assembly of apparatus.

To achieve the above objects, the present invention comprises two planes, a collimation device, and a continuous-zoom device. Reflected lights of the two planes interfere with each other to generate an interference pattern. The collimation device converts a parallel light of the interference pattern into a convergent light, which passes through an adjustment means of optical path and is guided to a polarization beam splitter (PBS). The continuous-zoom device is used to adjust the magnification ratio of the interference pattern on the imaging passageway and to output an object image, which is then imaged onto a charge-coupled device (CCD).

The various objects and advantages of the present invention will be more readily understood from the following detailed description when read in conjunction with the appended drawings, in which:

DETAILED DESCRIPTION OF PREFERRED EMBODIMENT

An interferometer is generally divided into two parts, one being a light projection device used for generating projection light, the other being an interference pattern imaging device. The present invention improves the part of imaging device to achieve the same or more effects without using a rotating diffuser. In order to clearly illustrate the function of the present invention, the structure and action of the whole interferometer will be described in detail.

Figure 1:
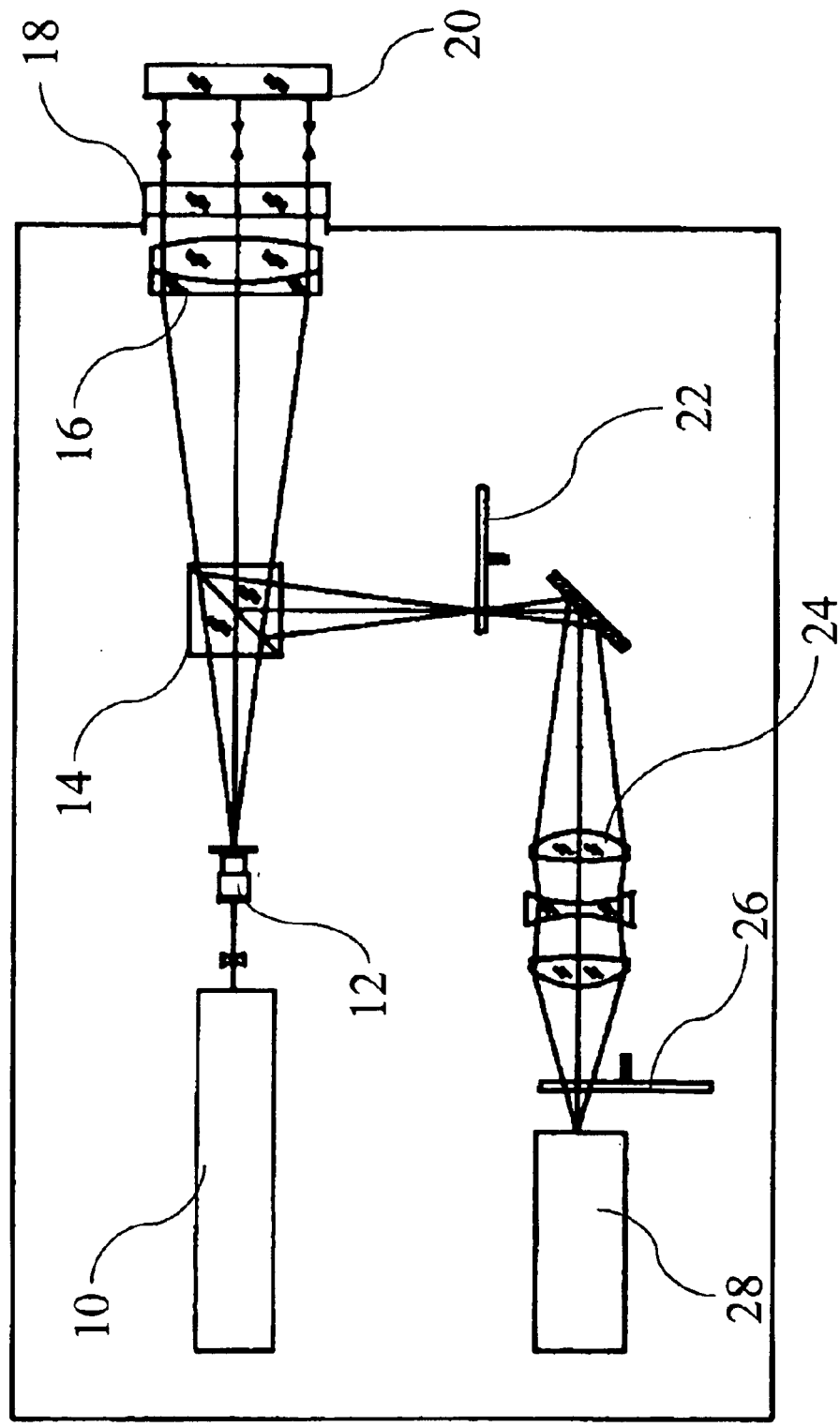
FIG. 1 is a structure diagram of a prior art interferometer.
Figure 2:
FIG. 2 is a diagram of an interference image formed in a prior art interferometer.
Figure 3:
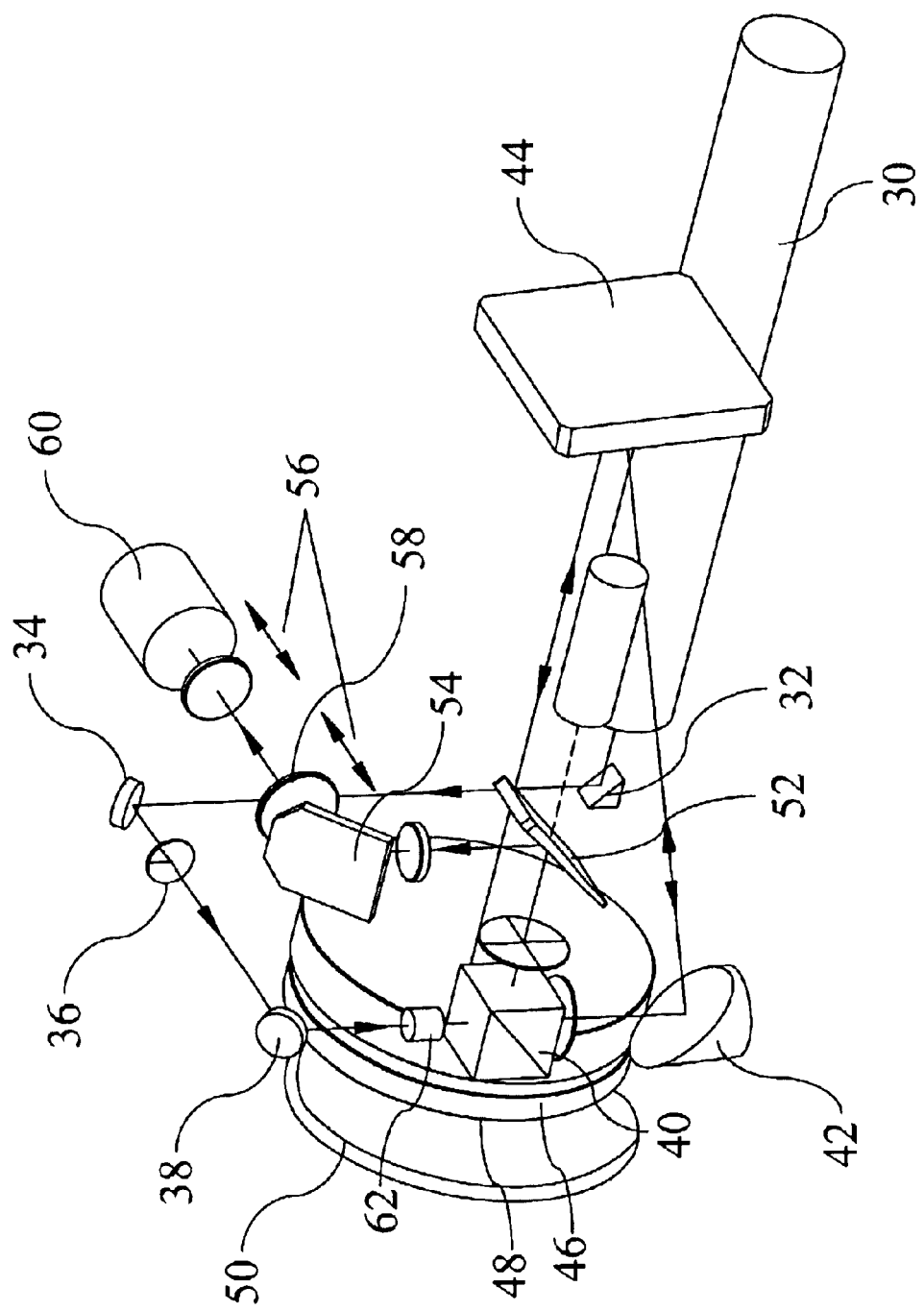
FIG. 3 is a structure diagram of an interferometer of the present invention.

As shown in FIG. 3, a light projection device comprises a laser 30 with an inbuilt spatial filter (not shown). A He—Ne laser light beam is outputted by the laser 30, passes through the inbuilt spatial filter to expand the laser light beam and achieve filtering effect, is reflected to an attenuator 36 for adjustment of light by a reflective piece 32 and a reflective mirror 34, is then reflected to and passes through a polarizing beam splitter (PBS) 40 including a quarter wave plate by a reflective mirror 38. The transmitted light is reflected in order by a rod mirror 42 and a primary mirror 44 and is then incident into a collimation device 46 so as to enter between a reference plane 48 and a test plane 50. The collimation device 46 is usually composed of collimation lens.

The continuous-zoom imaging device comprises reflected lights of the reference plane 48 and the test plane 50, which interfere with each other to generate an interference pattern. Parallel light of the interference pattern is converted to a convergent light having the interference pattern by the collimation device 46. The interference pattern is then guided from the collimation device 46 to the PBS 40 by an optical path adjustment means formed of the primary mirror 44 and the rod mirror 42. The PBS 40 vertically reflects the interference pattern and guides it to an imaging passageway. Planar reflective mirrors 52 and 54 on the imaging passageway guide the convergent light of the interference pattern to a continuous-zoom device 56, which is composed of two zoom lenses 58. The distance between the two zoom lenses 58 is adjusted to magnify the object image. The continuous-zoom device 56 has a continuous magnification ratio between 1× to 6×, and is used to adjust the magnified ratio of the interference pattern on the imaging passageway and to output an object image. Because the continuous-zoom device 56 is directly placed on a focus plane of a charge coupled device (CCD) 60, it can directly image the object image on the CCD 60, which then converts the object image into electronic signals.

A set of graded-index lens 62 is further disposed on the optical path between the reflective mirror 38 and the PBS 40 to expand and diffuse the light beam. In addition to being on the optical path of the light projection device, the above attenuator 36 can also be directly disposed on the optical path between the continuous-zoom device 56 and the CCD 60 or on the imaging optical path. The primary function of the attenuator 36 is to reduce the amplitude of the light beam for adjustment of light without any distortion in phase and frequency.

Figure 4:
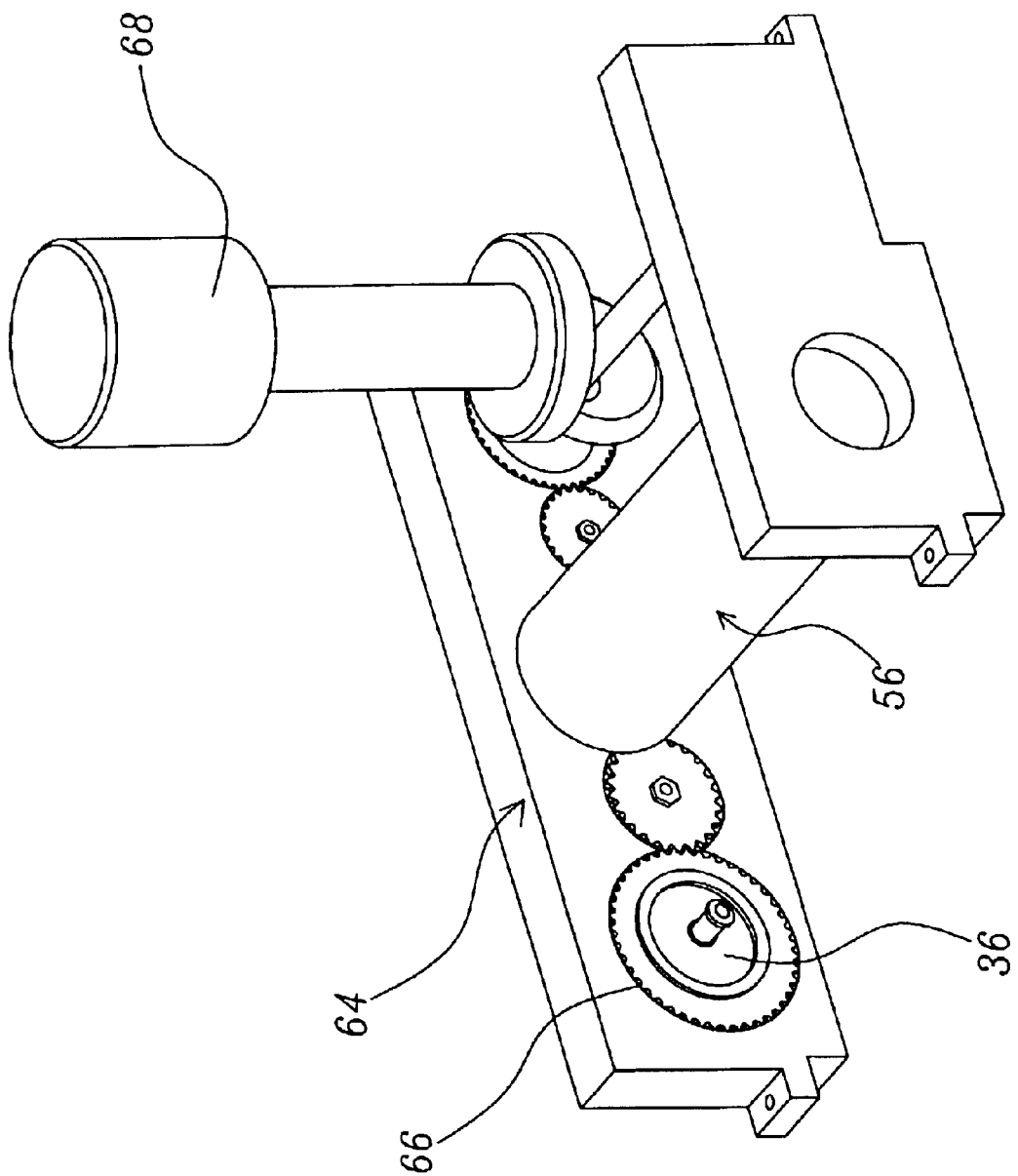
FIG. 4 is a joint structure diagram between a continuous-zoom device and an attenuator of the present invention.

Besides, in order to facilitate the operation, the attenuator 36 is connected to the continuous-zoom device 56 via a joint device 64 to form an automatic light adjustment structure. As shown in FIG. 4, the attenuator 36 is connected to the continuous-zoom device 56 via a joint device 64 formed of several joint gears 66. A knob 68 is also disposed between the joint device 64 and the continuous-zoom device 56 for adjusting the distance of the two zoom lenses 58 in the continuous-zoom device 56. The joint device 64 is simultaneously used to adjust the position of the attenuator 36 to achieve the object of adjustment of light. If only the position of the attenuator 36 is adjusted, there is no change of the continuous-zoom device 56. Therefore, the design of the joint device 64 in the present invention can maintain the quality of brightness of the interference pattern image during the zooming process and can further achieve the function of automation.

The present invention offers the same advantages as a system using a rotating diffuser, however, the present invention does not utilize a rotating diffuser. The reasons are summarized as follows.

1. Because the improvement of assembly environment and cleanliness of lenses, irrelative interference patterns can be eliminated to minimum. It is not necessary to use a rotating diffuser for eliminating them.
2. Time speckles can be evened through time integration of the CCD.
3. Because there is no rotating diffuser used, space speckles associated with the rotating diffuser disappear.

Beside the above advantages, the present invention has also the following advantages.

Figure 5:
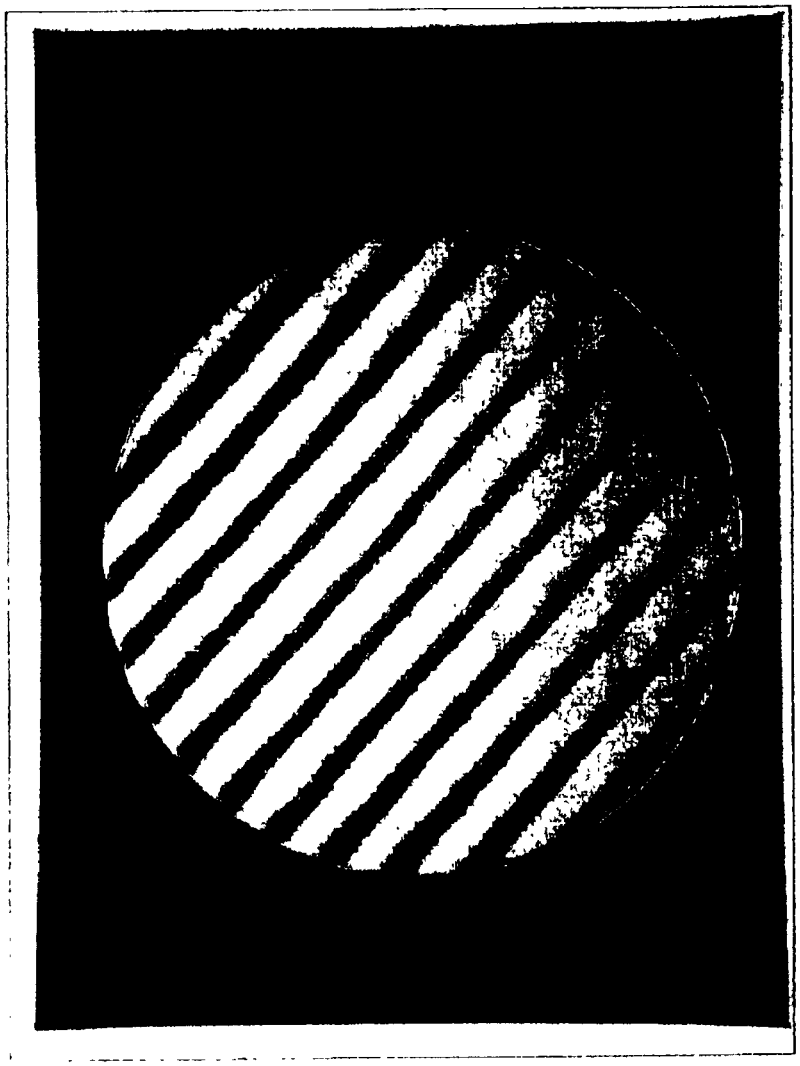
FIG. 5 is a diagram of an interference image formed in an interferometer of the present invention.

1. Because the continuous-zoom device (zoom lens) is directly placed between the focus plane of the CCD and the PBS, the optical path of the interference pattern is shortened, hence reducing noise disturbance in the optical path.
2. Different from the Lambertian light in the prior art diffuser, the light from the PBS to the continuous-zoom device is coaxial so there is no vignetting phenomenon of the interference pattern on the focus plane of the CCD. Therefore, the brightness at the edge and the center of the interference pattern are almost the same, hence obtaining a high-quality interference pattern image, as shown in FIG. 5.
3. Because there is no rotating diffuser structure, no motor is required so the problems of coaxial stability and vibration disappear. Moreover, the present invention has the characteristics of shrunk volume, reduced number of components, lowered costs, and easy assembly, hence being more applicable to applications in factories.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A continuous-zoom imaging device of an interferometer, comprising:

two planes whose reflected light beams interfere with each other to generate an interference pattern;

a collimation device for converting parallel light of said interference pattern into convergent light;

a polarizing beam splitter including a quarter-wave plate being used to guide said interference pattern to an imaging passageway;

an optical path adjustment means for guiding said convergent light from said collimation device to said polarizing beam splitter;

a continuous-zoom device for adjusting the magnification ratio of said interference pattern on said imaging passageway and outputting an object image, said interference pattern remaining substantially unchanged between said polarizing beam splitter and said continuous-zoom device, the light beam of said interference pattern entering said continuous-zoom device as a coaxial light beam;

a charge coupled device whereon said object image is imaged, said charge coupled device being used for converting said image into electronic signals;

a light projection device for producing said light reflected by said two planes; and, an attenuator being positioned in the optical path of said light projection device, said attenuator communicating with said continuous-zoom device via a joint device to form an automatic light adjustment structure.

2. The continuous-zoom imaging device of an interferometer as claimed in claim 1, wherein said interference pattern generated by said two planes is formed by interference of reflected lights of a test plane and a reference plane.

3. The continuous-zoom imaging device of an interferometer as claimed in claim 1, wherein said optical path adjustment means utilizes at least a reflective mirror to guide said convergent light from said collimation device to said polarizing beam splitter.

4. The continuous-zoom imaging device of an interferometer as claimed in claim 1 further comprising a graded-index lens for expanding and diffusing light prior to said light entering said polarizing beam splitter.

5. The continuous-zoom imaging device of an interferometer as claimed in claim 1, wherein said continuous-zoom device can adjust the distance between two zoom lens for amplifying said object image with a continuous magnification ratio from 1× to 6×.

6. The continuous-zoom imaging device of an interferometer as claimed in claim 1 further comprising an attenuator on the optical path between said continuous-zoom device and said charge coupled device.

7. The continuous-zoom imaging device of an interferometer as claimed in claim 1 further comprising an attenuator on said imaging optical path.

8. The continuous-zoom imaging device of an interferometer as claimed in claim 6 or 7, wherein said attenuator is connected to said continuous-zoom device via said joint device to form an automatic light adjustment structure.

9. The continuous-zoom imaging device of an interferometer as claimed in claim 8, wherein said attenuator can be separately adjusted, and aid joint device will not reversely affect said continuous-zoom imaging device.

* * * * *